United States Patent
Bürkle et al.

(10) Patent No.: US 6,585,291 B2
(45) Date of Patent: Jul. 1, 2003

(54) SIDE GAS BAG

(75) Inventors: Kai Bürkle, Kernen (DE); Jochen Gunst, Wäschenbeuren (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/726,673

(22) Filed: Nov. 29, 2000

(65) Prior Publication Data

US 2001/0038198 A1 Nov. 8, 2001

(30) Foreign Application Priority Data

Dec. 2, 1999 (DE) .......................... 199 58 099

(51) Int. Cl.⁷ .............................................. B60R 21/16
(52) U.S. Cl. ................ 280/743.1; 280/730.2; 280/732
(58) Field of Search ........................ 280/730.2, 743.1, 280/732

(56) References Cited

U.S. PATENT DOCUMENTS

| | | | | |
|---|---|---|---|---|
| 5,275,435 A | * | 1/1994 | Fischer .................... | 280/743.1 |
| 5,324,070 A | * | 6/1994 | Kitagawa et al. ........ | 280/730.1 |
| 5,492,367 A | * | 2/1996 | Albright et al. ......... | 280/743.1 |
| 5,667,243 A | * | 9/1997 | Fisher et al. ............. | 280/730.2 |
| 5,765,863 A | * | 6/1998 | Storey et al. ............ | 280/729 |
| 5,806,881 A | * | 9/1998 | Richter et al. .......... | 280/730.2 |
| 5,823,567 A | * | 10/1998 | Behr et al. ............... | 280/743.1 |
| 5,899,490 A | * | 5/1999 | Wipasuramonton et al. | 280/730.2 |
| 5,921,576 A | * | 7/1999 | Sinnhuber ................ | 280/730.2 |
| 5,951,039 A | * | 9/1999 | Severinski et al. ...... | 280/730.2 |
| 5,992,882 A | * | 11/1999 | Ito et al. .................. | 280/743.1 |
| 6,050,636 A | * | 4/2000 | Chevallier et al. ..... | 297/216.13 |
| 6,142,507 A | * | 11/2000 | Okuda et al. ........... | 280/730.2 |
| 6,279,944 B1 | * | 8/2001 | Wipasuramonton et al. | 280/730.2 |

FOREIGN PATENT DOCUMENTS

DE    19626761 C1    10/1997

* cited by examiner

Primary Examiner—Lesley D. Morris
Assistant Examiner—Paul Royal, Jr.
(74) Attorney, Agent, or Firm—Tarolli, Sundheim, Covell & Tummino L.L.P.

(57) ABSTRACT

An assembly consists of a vehicle structure including a vehicle side wall and of a gas bag side impact protection system including a gas bag. The gas bag is adapted to be inflated by means of compressed gas furnished by a source of compressed gas and comprising an outer side facing the vehicle side wall and an inner side facing the vehicle interior. The section of the gas bag located above the inflation port is folded at least twice and forms a stack at the outer side of the gas bag, the folds running substantially horizontally.

7 Claims, 6 Drawing Sheets

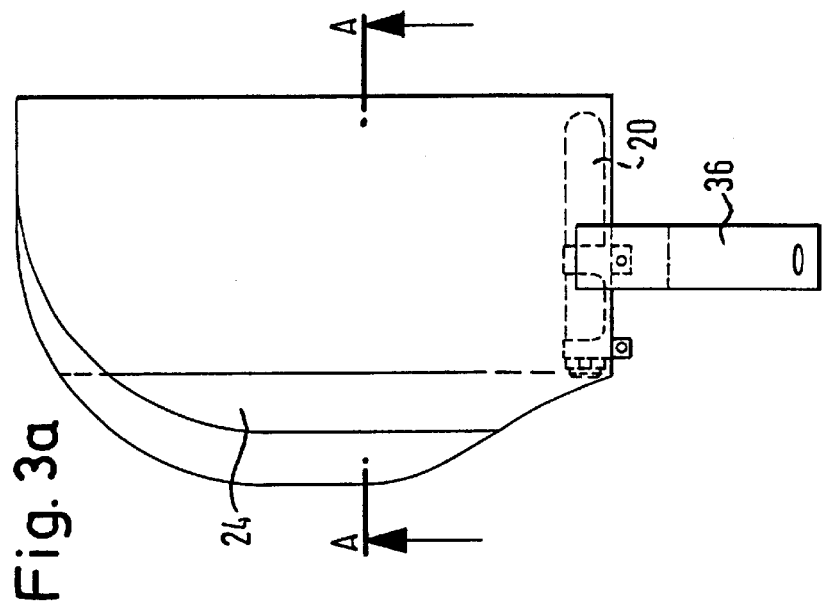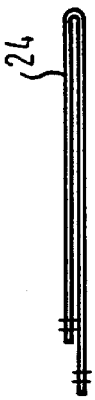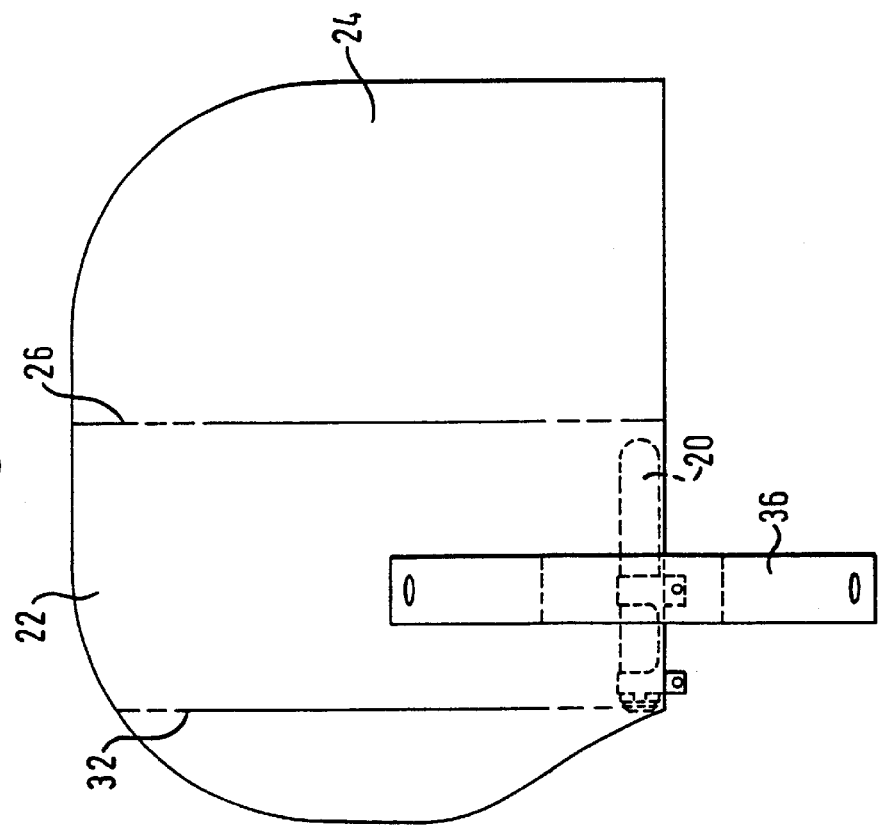

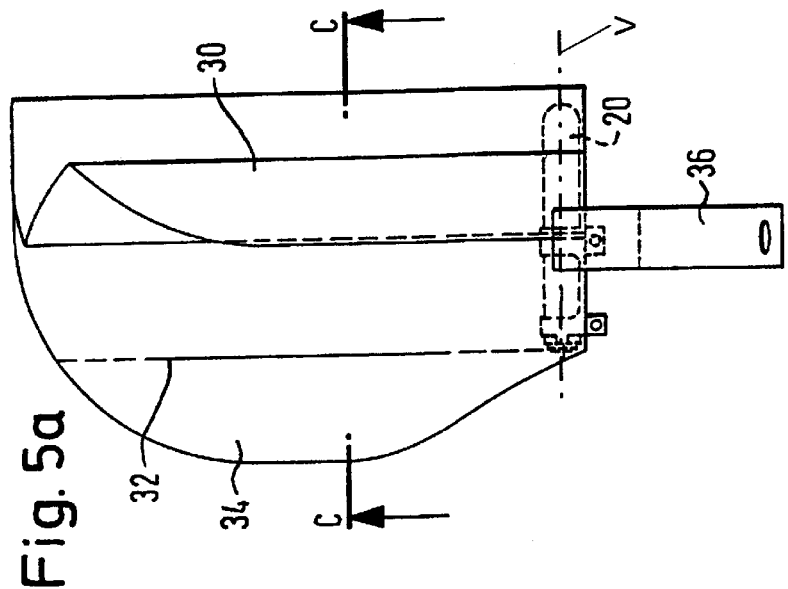
Fig. 4b  Fig. 4a
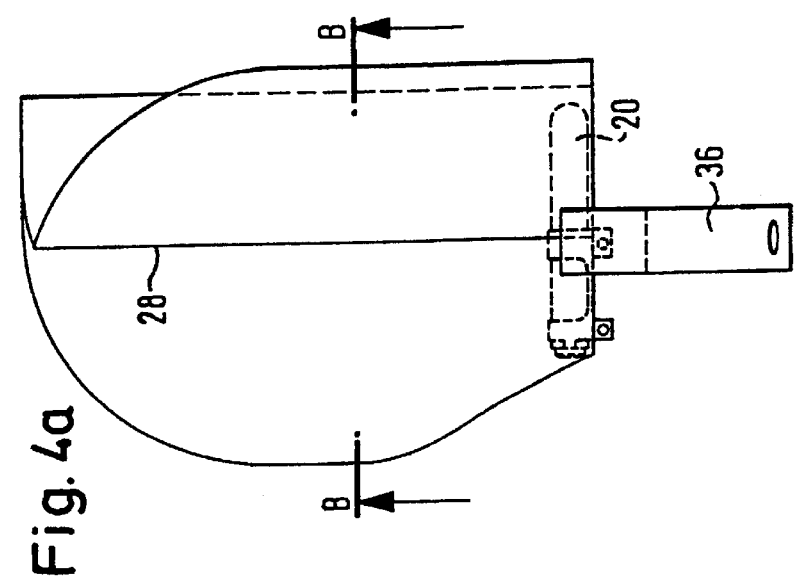
Fig. 5b  Fig. 5a

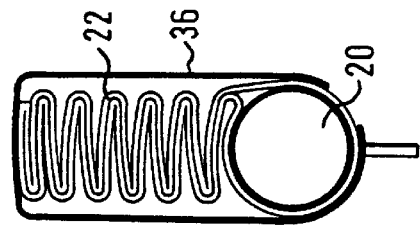
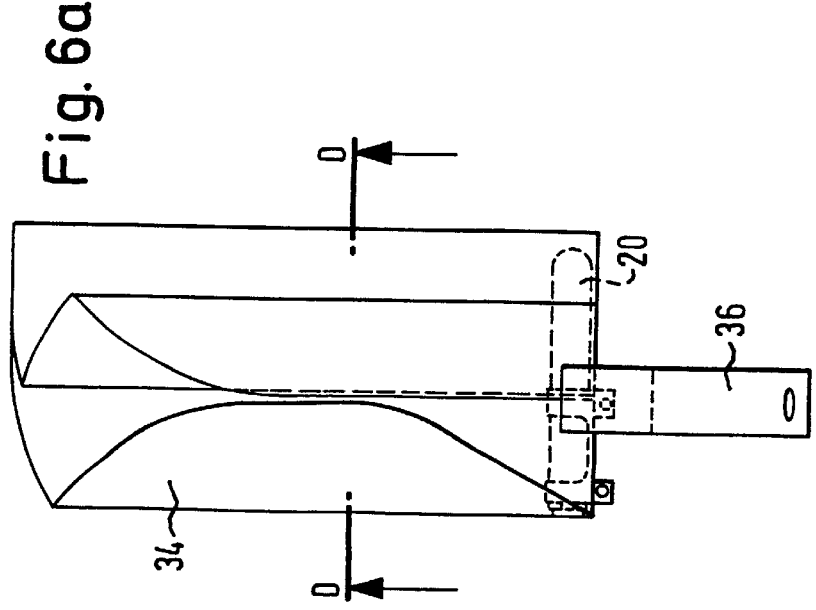

SIDE GAS BAG

TECHNICAL FIELD

The invention relates to the field of side gas bags and to the folding thereof.

BACKGROUND OF THE INVENTION

The Inflation of a gas bag exposes the vehicle occupant to a risk of injury, especially when he/she is not seated properly, for instance when looking out of the side window. In this posture the shock in deploying the upper part of the gas bag may impact the chin of the vehicle occupant with near "knockout" severity. Especially toddlers are exposed to this problem since, for one thing, their head is located nearer to the gas bag than the head of a adult person and, for another, the severity of such an impact poses an extreme danger to them.

The invention is based on the object of sophisticating an assembly of the aforementioned kind so that the cited risk is practically obviated.

BRIEF SUMMARY OF THE INVENTION

The invention provides an assembly comprising a vehicle structure and a gas bag side impact protection means with a gas bag and a source of compressed gas, the vehicle structure including a vehicle side wall and a vehicle interior, the gas bag being inflatable by means of compressed gas furnished by a source of compressed gas, the gas bag when inflated comprising an outer side facing the vehicle side wall and an inner side facing the vehicle interior the gas bag comprising a section which, when the gas bag is inflated, is located above the inflation port, the section being folded at least twice, forming a stack at the outer side of the gas bag, the folds resulting from folding the section running substantially horizontally. When a gas bag folded in such a way is inflated, it deploys on inflation initially in the direction of the vehicle outer side before it is then directed upwards. This results in the head of the vehicle occupant not being impacted from underneath and forced upwards. Rather, the head of the occupant is captured by the full surface area of the gas bag and moved in the direction of the vehicle interior.

The invention provides furthermore a gas bag for gas bag side impact protection means of an assembly in accordance with the invention. Likewise an object of the invention is a method of folding a gas bag for a gas bag side impact protection means of an assembly in accordance with the invention.

In accordance with one preferred embodiment of the invention the section of the gas bag located above the inflation port is concertina-folded. This concertina folding results in the gas bag being deployed stepwise and shifted upwards along the vehicle side wall.

Further advantageous developments of the invention read from the sub-claims

BRIEF DESCRIPTION OF THE DRAWINGS

FIG. 2 is a plan view of a gas bag after a first step in the folding method in accordance with the invention;

FIGS. 3a and 3b are a plan view and cross-sectional view respectively of the gas bag as shown in FIG. 2 after a second step in the method;

FIGS. 4a and 4b are a plan view and cross-sectional view respectively of the gas bag as shown in FIG. 2 after a third step in the method FIGS. 5a and 5b are a plan view and cross-sectional view respectively of the gas bag as shown in FIG. 2 after a fourth step in the method FIGS. 6a and 6b are a plan view and cross-sectional view respectively of the gas bag as shown in FIG. 2 after a fifth step in the method FIG. 7 is a cross-section through the gas bag as shown in FIG. 2 after a sixth step in the method.

DETAILED DESCRIPTION OF A PREFERRED EMBODIMENT

Figure 1A:
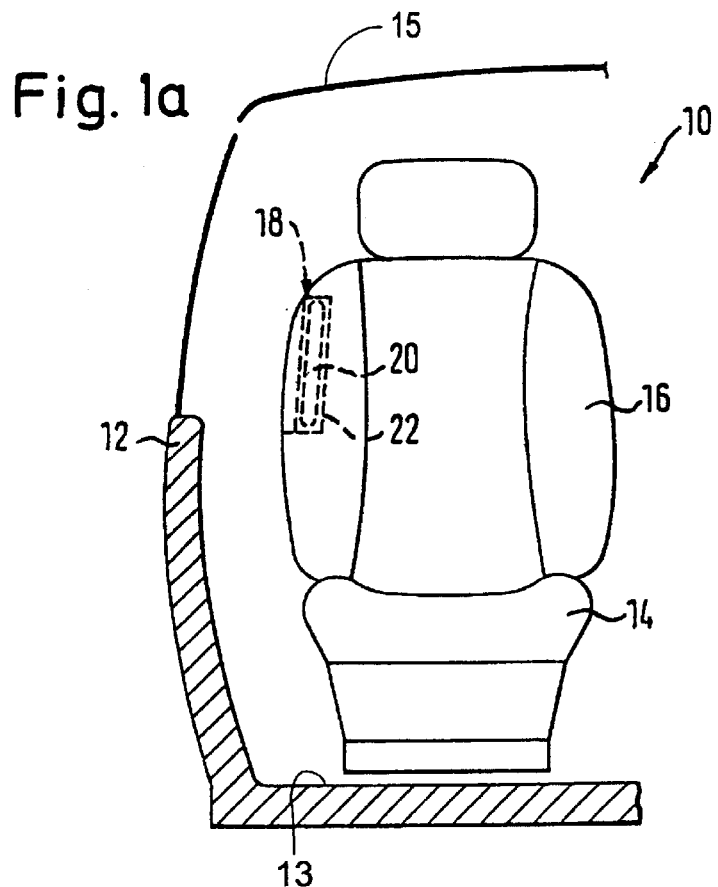
FIGS. 1a–f illustrate an assembly in accordance with the invention in a sequence of deployment stages of the gas bag.

For a better understanding of what is involved, first the method in accordance with the invention for folding a gas bag will be explained. Illustrated in FIGS. 2 to 7 are the individual steps involved in folding a gas bag for a side impact protection means by the method in accordance with the invention. Illustrated in each case in the upper portion of the FIGS. 3 to 6 and in FIG. 7 is a section through the gas bag after the corresponding step in the method has been accomplished.

The gas bag is first spread out flat with the outer side, which later in the installed condition is to face the vehicle side wall, facing upwards so that the inflation port or the inflator 20 fitted thereto faces forwards (downwards in the drawing) and with the section 24, which is in the installed condition located above the inflation port, facing to the right (FIG. 2). The section 24 is folded to the left along a line 26 running from the right-hand edge of the inflator to the rear (FIG. 3). The line 26 is horizontal relative to the vertical longitudinal axis V of the inflator 20. One half of the upper section 24 that has been folded to the left is not folded to the right along a second fold 28 running parallel to the first fold 26 (FIG. 4). The half folded to the right is again halved and the outlying section 30 folded to the left so that now the parts of the upper section 24 having resulted from the triple fold are located stacked (FIG. 5) Now, the left-hand section 34 is folded inwards to the right along a fold 32 starting from the left-hand edge of the inflator 20 parallel to the other folds 26, 28 (FIG. 6). The gas bag 22 can then be e.g. concertina-folded conventionally (FIG. 7) and held together by the restraining tape 36.

Referring now to FIGS. 1a–1f there is illustrated an assembly in accordance with the inventions comprising a vehicle structure 10 including a vehicle floor 13, vehicle roof 15, vehicle side wall 12 and a seat 14. The seat 14 has a backrest 16. Incorporated in the backrest 16 at the side facing the vehicle outer side is a gas bag side impact protection means 18 including an inflator 20 and a gas bag 22. The gas bag 22 is folded in accordance with the method as described above in accordance with the invention.

When the side impact protection means 18 is activated, the inflator 20 is ignited and furnishes compressed gas which flows into the gas bag 22, causing the gas bag 22 to deploy.

Figure 1B:
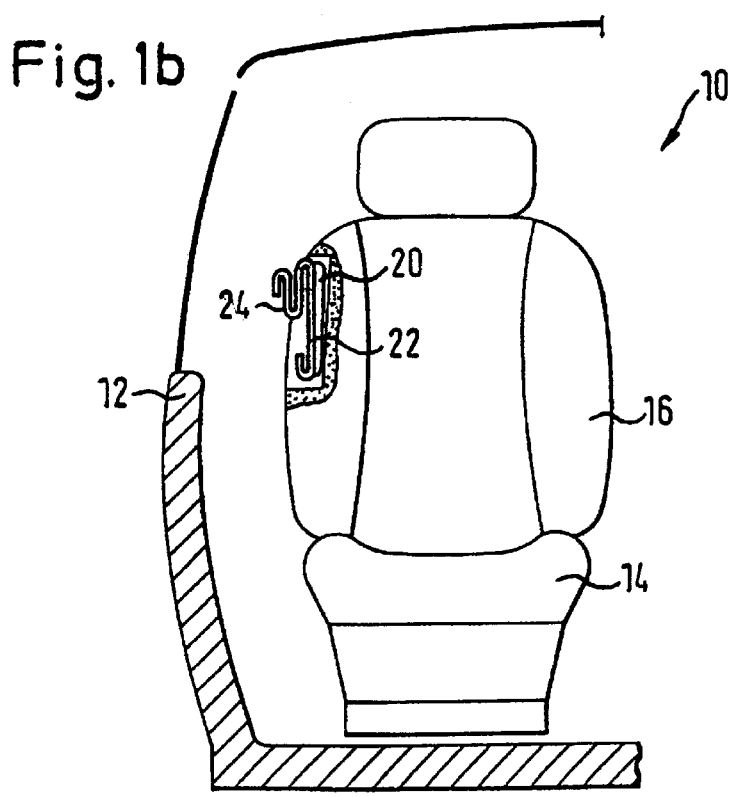
Figure 1C:
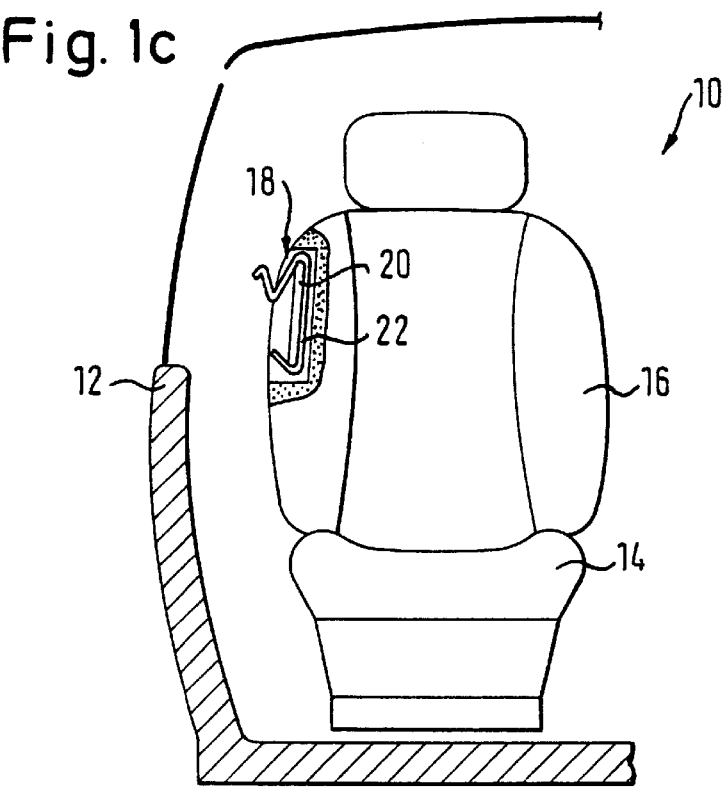
Figure 1D:
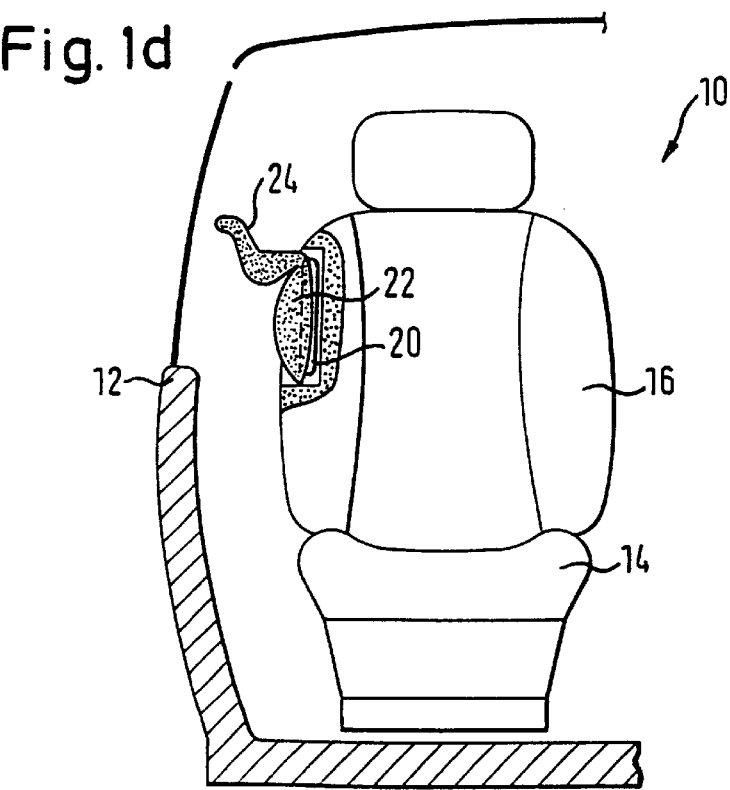
Figure 1E:
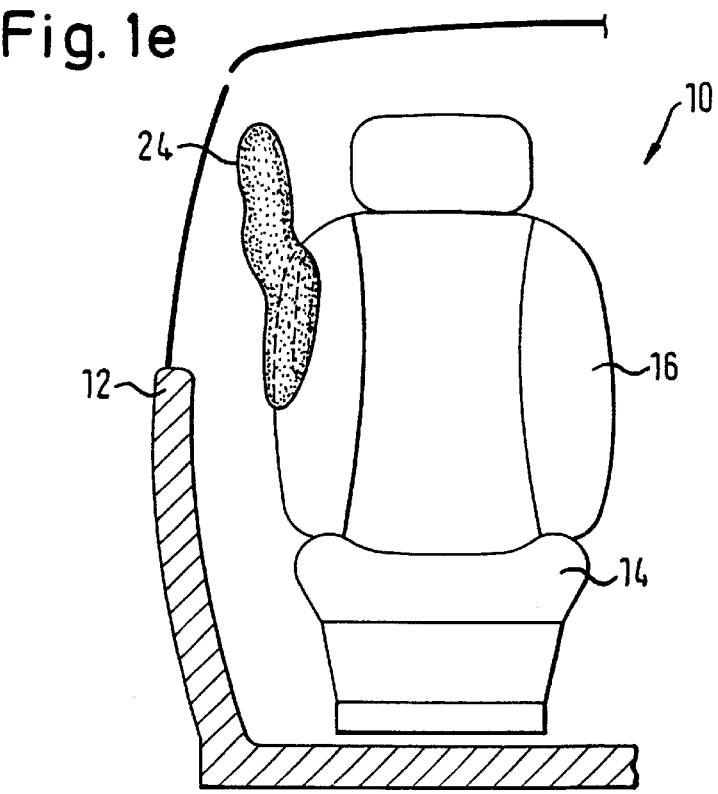
Figure 1F:
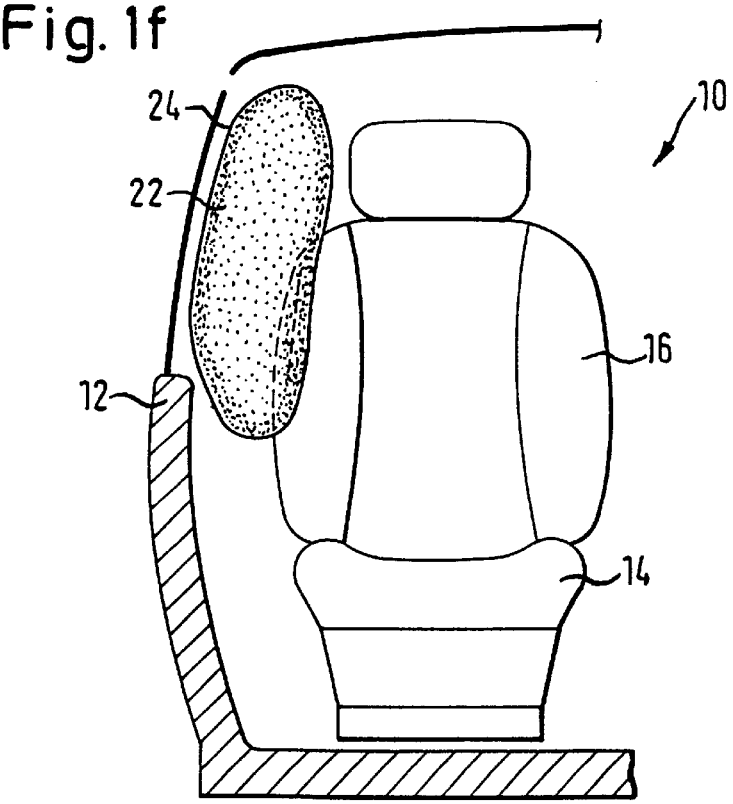

The gas bag 22 firstly deploys substantially along the vehicle side wall 12 in the forward direction of the vehicle— perpendicular to the image plane of the drawing—the upper section 24 forming a stack on the outer side of the gas bag 22, which side is facing the vehicle side wall. The inflowing compressed gas causes the gas bag 22 to deploy further so that the concertina-folded upper section 24 is first moved in a direction substantially towards the vehicle side wall 12 (FIGS. 1b and 1c). Further inflow of the compressed gas causes the upper section 24 to unfold upwards along the vehicle side wall 12 (FIGS. 1d and 1c) until the gas bag 22 is fully deployed (FIG. 1f).

As evident, a gas bag folded in this way is unable to exert a "knockout" blow to the chin of the vehicle occupant when deployed, even when he/she is not in an optimum seated posture, for instance in the case of a toddler kneeling on the seat with head down or turned to the side.

It will readily be appreciated that the invention is not, of course, restricted to the embodiment as shown. Instead, the gas bag side impact protection means could be incorporated together with the gas bag just as well in the seat back of a rear seatbench or in the dashboard, for example, in the vicinity of the A pillar.

And, of course, instead of the concertina fold of the upper section 24 any other, for example, spiral fold is feasible as long as a stack materializes on the outer side of the gas bag 22 so that it is the upper section that first moves in the direction of the vehicle side wall when deployed.

What is claimed is:

1. An assembly comprising:
    a vehicle structure; and
    a gas bag side impact protection means with a gas bag and a source of compressed gas having an inflation port,
    said vehicle structure including a vehicle side wall and a vehicle interior,
    said gas bag being inflatable by compressed gas furnished by said source of compressed gas through said inflation port,
    said gas bag when inflated comprising an outer side facing said vehicle side wall and an inner side facing said vehicle interior,
    said gas bag being located off-center from said inflation port,
    said gas bag being folded at least twice to form a stack of overlying folds at said outer side of said gas bag, said folds having at least two fold creases folded along a horizontal axis relative to a vertical axis of the source of compressed gas,
    each horizontal fold crease having at least two fold creases folded along the vertical axis to cause each fold to have overlapping horizontal and vertical fold creases,
    said gas bag when folded having a portion with a greater concentration of folds located off set from said inflation port of said source of compressed gas, and said gas bag when folded having a portion with a lesser concentration of folds,
    said gas bag portion with said greater concentration of folds having a greater inflation volume relative to an inflation volume of said gas bag portion with said lesser concentration of folds.

2. The assembly of claim 1, wherein said vertical fold creases of said gas bag are concertina-folded.

3. The assembly of claim 1, comprising a vehicle seat with a backrest, said gas bag being incorporated in said backrest of said vehicle seat.

4. The assembly of claim 1, wherein said vehicle structure further includes a vehicle roof and a vehicle floor and wherein said greater concentration of folds of said gas bag first moves in the direction of the vehicle side wall when said gas bag inflates, said greater concentration of folds of said gas bag unfolding upwards along the vehicle side wall toward the vehicle roof until said gas bag is fully inflated.

5. The assembly of claim 4, wherein said greater concentration of folds of said gas bag are located closer to said vehicle roof relative to a location of said inflation port which is located closer to said vehicle floor.

6. A gas bag side impact protection means for helping to protect a vehicle occupant, said side impact protection means comprising:
    a source of compressed gas having an inflation port;
    a gas bag inflatable by means of compressed gas furnished by said source of compressed gas through said inflation port,
    said gas bag when inflated comprising an outer side facing a vehicle side wall and an inner side facing a vehicle interior,
    said gas bag being located off-center from said inflation port,
    said gas bag being folded at least twice to form a stack of overlying folds at said outer side of said gas bag, said folds having at least two fold creases folded along a horizontal line relative to a vertical axis of said source of compressed gas,
    each horizontal fold crease having at least two fold creases folded along the vertical axis to cause each fold to have overlapping horizontal and vertical fold creases,
    said gas bag when folded having a portion with a greater concentration of folds located off set from said inflation port of said source of compressed gas, and said gas bag when folded having a portion with a lesser concentration of folds,
    said gas bag portion with said greater concentration of folds having a greater inflation volume relative to an inflation volume of said gas bag portion with said lesser concentration of folds.

7. The assembly of claim 6, wherein said vertical fold creases of said gas bag are concertina-folded.

* * * * *